(12) United States Patent
Duelli

(10) Patent No.: US 6,629,682 B2
(45) Date of Patent: Oct. 7, 2003

(54) VACUUM VALVE

(75) Inventor: Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/759,025

(22) Filed: Jan. 11, 2001

(65) Prior Publication Data

US 2002/0088959 A1 Jul. 11, 2002

(51) Int. Cl.[7] .................................................. F16K 1/46
(52) U.S. Cl. ....................... 251/158; 251/328; 251/332; 251/334; 251/364
(58) Field of Search .................................. 251/158, 193, 251/300, 301, 326, 328, 332, 333, 334, 359, 364

(56) References Cited

U.S. PATENT DOCUMENTS

| | | | | |
|---|---|---|---|---|
| 3,089,678 A | * | 5/1963 | Grove | 251/327 |
| 3,185,435 A | | 5/1965 | Hauser | |
| 3,401,915 A | * | 9/1968 | Kim | 251/174 |
| 3,722,852 A | * | 3/1973 | Powell et al. | 251/333 X |
| 3,763,894 A | * | 10/1973 | Meyer | 251/333 X |
| 4,208,035 A | * | 6/1980 | Alvarez et al. | 251/328 X |
| 4,560,141 A | | 12/1985 | Bosch | |
| 4,688,757 A | * | 8/1987 | Cook et al. | 251/332 X |
| 4,773,440 A | * | 9/1988 | Yanagawa et al. | 251/326 X |
| 4,776,564 A | * | 10/1988 | Westenberg | 251/328 X |
| 5,013,009 A | * | 5/1991 | Nelson | 251/328 X |
| 5,163,655 A | * | 11/1992 | Chickering et al. | 251/174 |
| 5,249,600 A | * | 10/1993 | Blume | 251/334 X |
| 5,415,376 A | | 5/1995 | Ito | |
| 5,482,254 A | * | 1/1996 | Greenwood et al. | 251/332 X |
| 5,641,149 A | | 6/1997 | Ito | |
| 5,755,255 A | | 5/1998 | Iwabuchi | |
| 5,934,646 A | | 8/1999 | Tamura et al. | |
| 6,045,117 A | | 4/2000 | Tamura et al. | |
| 6,056,266 A | | 5/2000 | Blecha | |
| 6,082,706 A | | 7/2000 | Irie | |
| 6,089,543 A | * | 7/2000 | Freerks | 251/357 |
| 6,095,180 A | | 8/2000 | Ishigaki et al. | |

FOREIGN PATENT DOCUMENTS

| | | |
|---|---|---|
| DE | 32 09 217 | 10/1985 |
| DE | 32 24 387 | 5/1987 |
| DE | 196 33 798 | 2/1998 |
| EP | 1 028 278 | 8/2000 |

* cited by examiner

Primary Examiner—Gene Mancene
Assistant Examiner—Eric Keasel
(74) Attorney, Agent, or Firm—Reed Smith LLP

(57) ABSTRACT

A vacuum valve comprises a wall with a valve opening and a valve seat, a valve plate which is pressed against the valve seat in the closed state, an elastic sealing ring which is arranged at the valve plate or at the valve seat and, in the closed state of the valve, is pressed by a pressing force against a sealing surface arranged at the valve seat or at the valve plate and seals the valve opening, and a supporting ring which is made of plastic and which is arranged at the valve plate or at the valve seat and, at least in the closed state of the vacuum valve, lies closer to the valve opening than the sealing ring, viewed from the sealing ring, and limits the pressing force acting on the sealing ring in the closed state of the vacuum valve.

4 Claims, 3 Drawing Sheets

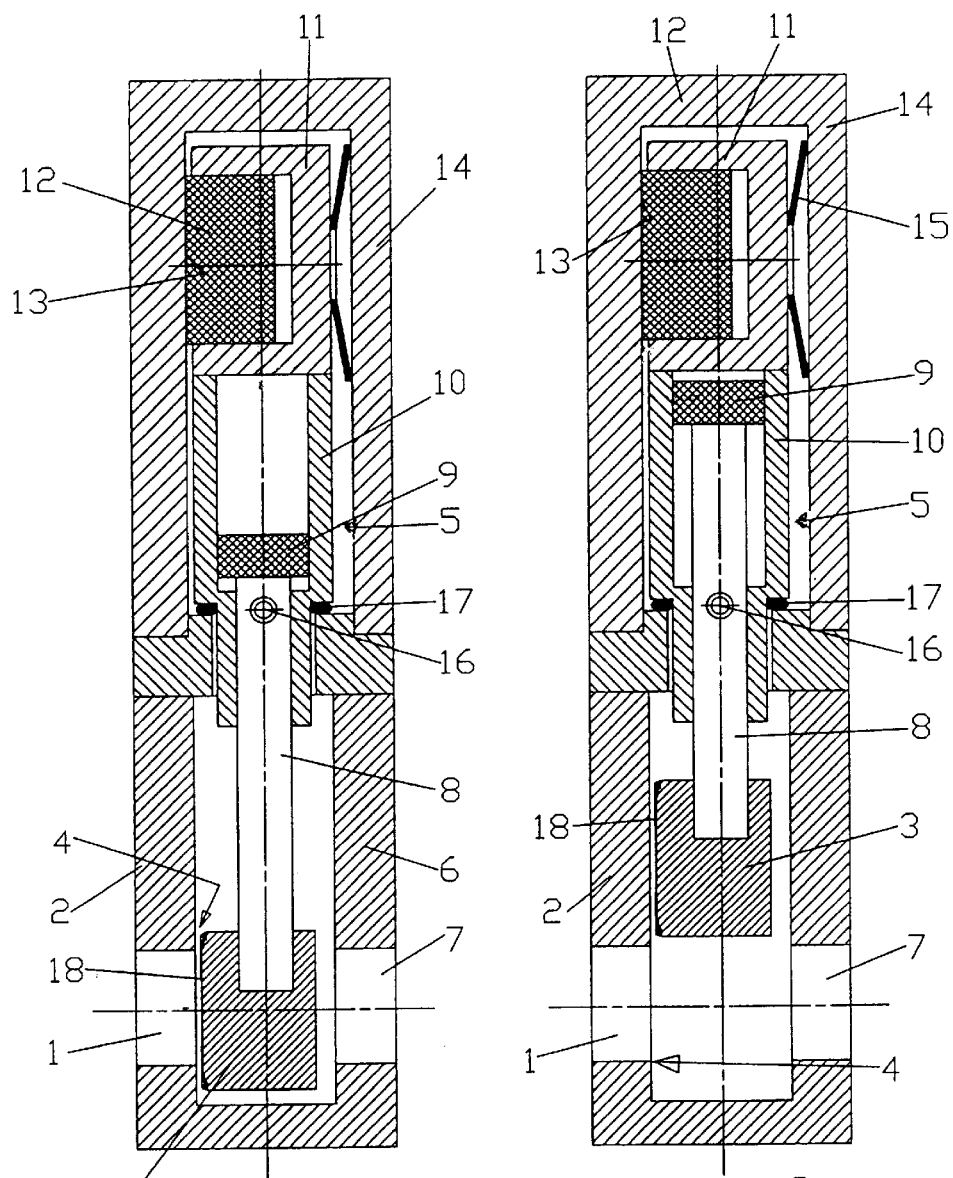
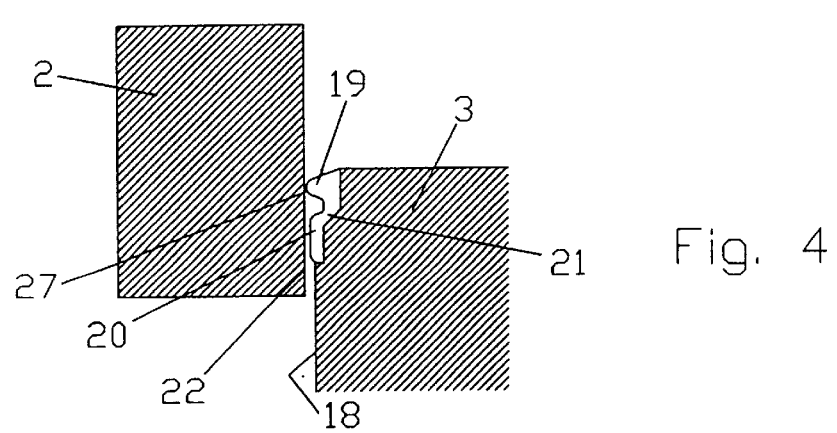

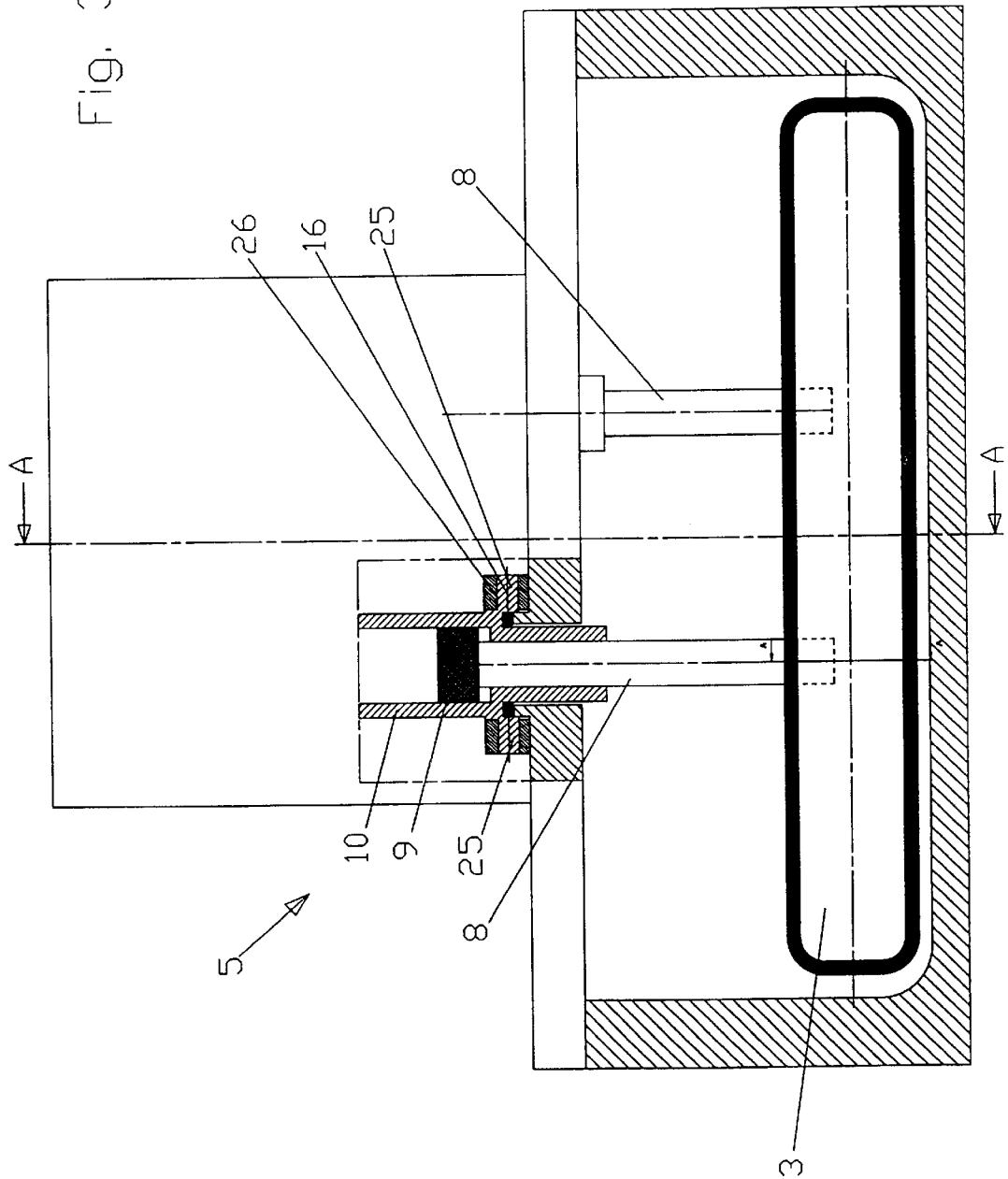

VACUUM VALVE

The invention is directed to a vacuum valve in which a valve plate is pressed against a valve seat in the closed state of the valve, so that a valve opening in a wall is closed. This wall can be formed, for example, by a housing wall of the vacuum valve or by the wall of a vacuum chamber, wherein this wall of the vacuum chamber comprising the valve opening and valve seat is therefore considered a part of the vacuum valve. In order to seal the valve opening by means of the valve plate pressing against the valve seat, an elastic sealing ring is provided. This sealing ring can be arranged at the valve plate or at the valve seat. The sealing ring which can be formed, for example, as a circular ring when the valve plate is circular is pressed against a sealing surface in the closed state of the valve. When the sealing ring is arranged at the valve plate, the sealing surface is located at the valve seat. Conversely, the sealing surface is located at the valve plate when the sealing ring is arranged at the valve seat.

Further, the invention is directed to a valve plate for sealing a valve opening in a wall. Further, the invention is directed to a sealing arrangement for a vacuum valve for sealing a valve opening in a wall by means of a valve plate.

Vacuum valves of the plate valve type in which the valve opening is closed by a valve plate which is pressed against the valve seat surrounding the valve opening are known in many different embodiment forms.

A first common embodiment form of plate valves of the type mentioned above is the slide valve. In order to close the valve in this case, the valve plate is initially displaced linearly by an actuation device in a direction transverse to the sealing surface until it is in a position which is located opposite the valve opening, but is lifted from the valve seat. Subsequently, a movement is carried out vertical to the sealing surface and in the direction of the longitudinal axis of the valve opening, so that the valve plate is pressed against the valve seat. This two-step movement process is required so that the seal which is made of an elastic material, e.g., Viton®, is not exposed to shearing stress, which would lead to unacceptable wear. The second step of the closing movement is achieved in different ways in slide valves of the type mentioned above, for example, by means of lever mechanisms, rolling bodies which are guided in wedge-shaped gaps between the valve plate and a supporting plate, tilting elements, and so on. In order to prevent bending of the valve rod during the second movement step (movement vertical to the sealing surface or valve opening), a counter-plate is usually provided which is moved simultaneously against a wall located opposite the valve seat. Slide valves of this type are known, for example, from U.S. Pat. No. 4,560,141 A, DE 32 09 217 C2, DE 32 24 387 C2 and U.S. Pat. No. 3,185,435 A.

In a special type of plate valve or slide valve, the second movement step, that is, the movement of the valve plate against the valve seat by a movement directed essentially vertical to the sealing surface, is carried out in that the valve rod is swiveled about a fulcrum. This fulcrum can be formed by pins or rollers which are arranged laterally at the valve rod and guided in guide grooves. Accordingly, the valve rod is constructed in this instance in the manner of a lever which is initially displaced linearly and is then tilted. Examples of valve constructions of this type are shown in U.S. Pat. No. 5,415,376 A, U.S. Pat. No. 5,641,149 A, U.S. Pat. No. 6,045,117 A, U.S. Pat. No. 5,934,646 A, U.S. Pat. No. 5,755,255 A, U.S. Pat. No. 6,082,706 A and U.S. Pat. No. 6,095,180 A.

In another type of plate valve, there is no linear displacement of the valve plate in the first step of the valve plate movement; rather, the valve plate is swiveled along an arc in order to move the valve plate into the position located opposite the valve opening. For this purpose, the valve rod is suspended by its end opposite the valve plate at a shaft so as to be swivelable about an axis extending vertical to the valve face. The second step of the closing movement of the valve plate in the direction of the valve seat is carried out by a linear displacement of this shaft.

Another known type of plate valve is the angle valve, as it is called. In this valve, the valve rod to which the valve plate is secured is guided out of the vacuum through a wall located opposite the valve opening by means of a suitable lead-through.

Sealing rings made of elastic material are known for sealing the valve. A commonly used material for the sealing rings is known by the trade name Viton®, but sealing rings made from other materials are also common. The sealing rings are adapted to the respective circumferential contour of the valve plate and can thus be constructed, for example, in circular shape or can have other circumferentially closed contours, for example, approximately corresponding to the circumferential contour of a rectangle with rounded corners.

In conventional vacuum valves, the full contact pressure force with which the valve plate is pressed against the valve seat normally acts on the sealing ring in the closed state of the valve. In particular, when a differential pressure between the two areas which are sealed relative to one another acts upon the valve plate, there are considerable forces acting upon the sealing ring. These forces can far exceed the required sealing force. The sealing force is that force which must be exerted on the sealing ring in order to achieve sealing. In the event that differential forces of varying magnitude can act upon the valve plate, the force exerted on the sealing ring in these conventional constructions must at least equal the sealing force plus the force occurring as a result of maximum differential pressure. This contact pressing force is also exerted on the sealing ring when there is no differential pressure at all opposing the contact pressing force, so that a very high stress is exerted on the sealing ring in this case. This results in relatively rapid wear of the elastic material of the sealing ring. This problem is exacerbated when corrosive process gases are used. It has been determined that the elastic materials commonly used for the seals are chemically corroded by aggressive process gases particularly when they are under high stress.

Therefore, it has already been suggested to provide path limiting in the drive for the valve plate which limits the deformation of the elastic material of the sealing ring—independent from occurring differential pressure—to a predetermined value. However, path limiting of this type for very small paths to be monitored can only be realized at great expenditure and is, moreover, susceptible to disturbances.

Further, EP 1 028 278 A2 discloses a valve seal arrangement which shields the sealing ring from process gases. In this case, a protective seal which is constructed, for example, in the shape of a plate is provided in addition to the sealing ring and essentially completely covers the valve opening in the closed state of the valve. The edge of this flat protective seal is pressed against the surface surrounding the opening by the tension of the deformed sealing ring. Also, the deformation of the sealing ring in the closed state of the valve can be limited by this construction.

It is further known to provide the valve disk with a metal projection which is formed integral with the valve disk and which contacts a surface surrounding the valve opening in the closed state of the valve. This limits the deformation of the sealing ring. However, the contact of the metal projection of the valve plate at the surface, likewise made of metal, which surrounds the valve opening leads to unwanted release of particles adhering to the metal surfaces into the vacuum or onto parts located in the vacuum which are sensitive to impurities (such as wafers with high-purity surfaces).

A primary object of the present invention is to provide a vacuum valve of the type mentioned above in which the deformation of the sealing ring is limited in the closed state of the valve. The vacuum valve should also be constructed in a simple manner and there should be no unnecessary release of particles into the vacuum when the valve is closed. The invention has the further object of shielding the sealing ring from corrosive process gases in a vacuum valve of the type mentioned above in a simple manner. A further object of the invention is to provide a valve plate for sealing a valve opening in a wall in which the deformation of the sealing ring is limited in the closed state of the valve opening, wherein the valve plate has a simple construction and an unnecessary release of particles is prevented in the closed state of the valve. Another object of the invention is to provide a simple construction of a valve plate of the type mentioned above in which the sealing ring is shielded from process gases in the closed state of the valve opening.

The invention has the further object of providing a sealing arrangement for a vacuum valve for sealing a valve opening in a wall by means of a valve plate by which, in a simple construction of the sealing arrangement, the deformation of the sealing ring is limited in the closed state of the valve opening and the sealing ring is shielded from process gases.

A vacuum valve according to the invention comprises a supporting ring which is made of plastic and arranged at the valve plate or at the valve seat and, at least in the closed state of the vacuum valve, lies closer to the opening than the sealing ring viewed from the sealing ring, and which, in the closed state of the vacuum valve, limits the contact pressing force acting on the sealing ring. Further, a supporting ring of this kind shields the sealing ring from process gases in the closed state of the valve. When the valve is closed, there is no metal-on-metal contact between the valve plate and the valve seat, so that a release of particles is reduced when closing the valve. In a valve plate according to the invention, a supporting ring made of plastic is provided at the valve plate such that this supporting ring, viewed from the sealing ring, is arranged closer to the lateral surface of the valve plate than the sealing ring when the valve is open and limits pressing force acting on the sealing ring in the closed state of the valve plate.

In a preferred embodiment example of the invention, the supporting ring is connected to the sealing ring and is formed integral therewith. In other embodiment forms of the invention, the sealing ring and the supporting ring are constructed as separate parts.

The various features and constructions according to the invention are indicated in the claims.

Further advantages and details of the invention are described in the following with reference to embodiment examples shown in the drawings, wherein further objectives of the invention follow from these embodiment forms.

FIG. 1 shows a schematic section through a vacuum valve along line A—A from FIG. 3 in a state in which the valve plate is located opposite the valve opening, but is not pressed against it;

FIG. 2 shows a section corresponding to FIG. 1 in the open state of the valve;

FIG. 3 is a schematic front view of the valve, partly in section (the section line lies in the area of the valve plate between the wall having the valve opening and the valve plate);

FIG. 4 is a larger view of a partial area of a section corresponding to FIGS. 1 and 2;

Figure 7:
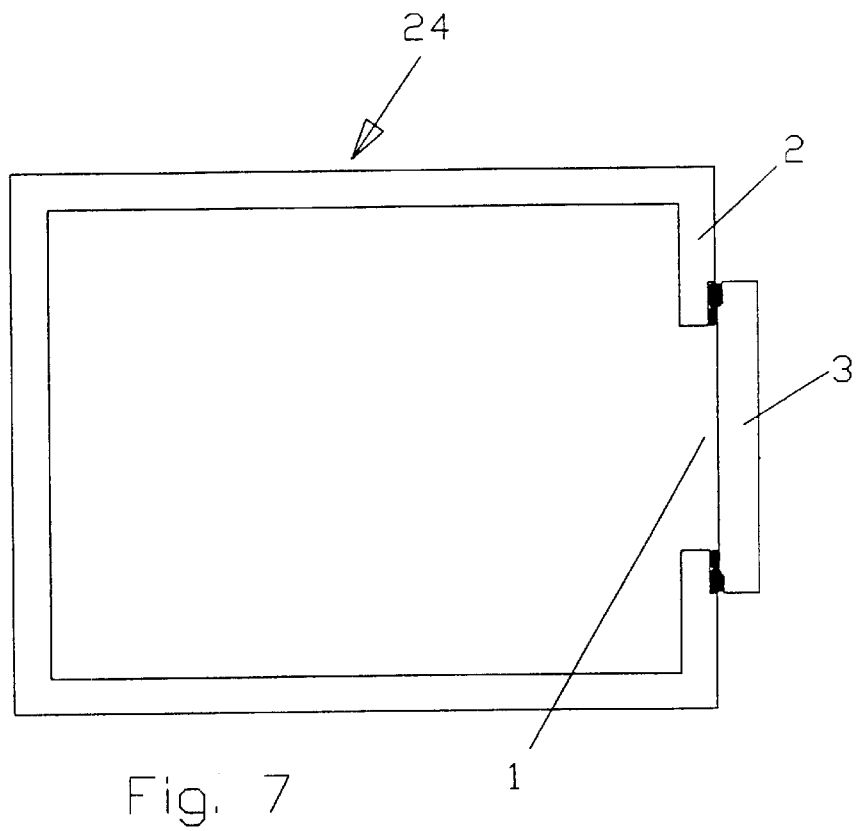
FIG. 7 is a schematic view of an embodiment form of the invention in which the valve opening is formed in the wall of a vacuum chamber.

In the embodiment example of the invention shown in FIGS. 1 to 4, a valve opening 1 is provided in the wall 2 of a valve housing. The valve opening 1 can be closed by a valve plate 3 which can be pressed against the area of the wall 2 which surrounds the valve opening 1 and which is located opposite the valve plate 3 and forms the valve seat 4.

In the open state of the valve shown in FIG. 2, the valve opening 1 is released by the valve plate 3. In order to enable a flow though the valve housing, an opening 7 is also provided in the wall 6 of the valve housing located opposite the wall 2.

An actuation device is provided in order to move the valve plate between the closed position in which it is pressed against the valve seat 4 and the open position which releases the valve opening 1. This actuation device is not the subject of the present invention and can be constructed in many different ways, for example, in a manner corresponding to the previously known prior art mentioned in the introductory part of the specification.

A possible actuation device 5 is shown schematically in FIGS. 1 to 3. This actuation device 5 comprises the valve rods 8, wherein the valve plate 3 is fastened to the front ends of the valve rods 8. The respective valve rod 8 simultaneously forms the piston rod of a piston 9 which is provided in a cylinder 10 arranged in the valve housing. By means of this piston 9, the valve plate 3 can be displaced linearly from the open position of the valve, shown in FIG. 2, into a position, shown in FIG. 1, which is located opposite the valve opening and valve seat. Another cylinder 11 is rigidly connected with cylinder 10. A piston 12 (shown schematically in FIG. 2 as a plunger piston:) is arranged in cylinder 11 and is movable transverse to the movement direction of the piston 9, its end protruding from the cylinder 11 being supported at the inner wall 13 of the valve housing. A spring device 15, for example, in the form of two disk springs, is provided on the opposite side of the cylinder 11 between cylinder 11 and the wall 14 of the valve housing located opposite the inner wall 13 and pretensions the cylinder 11 in the direction of the inner wall 13.

The cylinder 10, together with cylinder 11, is mounted so as to be swivelable about an axis 16. This axis 16 is formed by pins 25 which are arranged at both sides of the cylinder 10 and project into bore holes 26 in the valve housing. The axis 16 extends at right angles to the piston rod 8 and at right angles to the movement direction of the piston 12. By actuating the piston 12, the valve plate 3 can be swiveled out of the position, shown in FIG. 1, which lies opposite the valve opening but is lifted from the valve seat, into the closed position of the valve in which the valve plate is pressed against the valve seat. A bellows or an O-ring 17, for example, can be provided for sealing between the cylinder 10 and the valve housing.

A circumferentially closed seal arrangement is provided at the lateral surface 18 of the valve plate 3 facing the valve opening 1 in the area of the edge of the lateral surface 18. This sealing arrangement comprises an elastic sealing ring 19 which, in the closed state of the valve, is pressed against a sealing surface 27 located at the valve seat 4 and provides for sealing between the valve seat 4 and the valve plate 3. In this embodiment example, the sealing ring is constructed as a sealing lip as can be seen from FIG. 4. The sealing arrangement further comprises a supporting ring 20 which lies closer to the valve opening 1 than the sealing ring 19, viewed from the sealing ring 19. In this embodiment example of the invention, the supporting ring 20 is constructed in one piece with the sealing ring 19 and is connected with it via a connection web 21. The supporting ring 20 and the sealing ring 19 in this embodiment example are made of the same elastic material, for example, Viton. The contact surface of the supporting ring 20 at the surface 22 which surrounds the valve opening 1 and lies opposite the sealing arrangement is substantially larger than the contact surface of the sealing ring 19 at this surface 22 (which forms the sealing surface 27 in this area located opposite the sealing ring). The contact surface of the supporting ring 20 is preferably at least twice as large as that of the sealing ring 19 and, in a particularly preferred embodiment example of the invention, is at least three-times as large. Further, the thickness of the sealing ring 19 viewed in cross section is greater than that of the supporting ring 20, preferably about twice as large. The sealing ring 19, like the supporting ring 20, lies in depressions at the lateral surface 18 of the valve plate 3, wherein the depression for the sealing ring 19 is deeper than that for the supporting ring 20. The sealing arrangement in this embodiment example is preferably vulcanized to these depressions of the valve plate 3.

The position of the valve plate 3 shown in FIG. 4 corresponds to an intermediate position between the position shown in FIG. 1 and the completely closed position, wherein the vertex of the sealing ring 19 just contacts the surface 22 (which forms the sealing surface 27 in this area). The contact surface of the supporting ring 20 is still at somewhat of a distance from the surface 22. When the valve plate is pressed against the valve seat proceeding from this position, the sealing ring is deformed until the contact surface of the supporting ring 20 comes into contact with the surface 22. Because of the size of the contact surface of the supporting ring 20 and the small thickness of the supporting ring 20, the latter is deformed only slightly by the contact pressing force acting upon it. It accordingly absorbs a majority of the pressing force acting on the valve plate and limits the contact pressing force acting on the sealing ring 19 and the deformation of the latter. When a differential pressure acting in the opening direction is exerted on the valve plate in the closed state of the valve, the contact pressing force acting on the supporting ring 20 decreases by this differential pressure. However, the contact pressing force acting on the sealing ring 19 hardly changes, i.e., the sealing force which acts upon it and ensures the tightness of the valve is retained (as long as the total contact pressing force acting on the valve plate is large enough). When a differential pressure acting in the closing direction of the valve plate 3 is exerted on the valve plate 3, the contact pressing force exerted on the supporting ring 20 does increase, but the contact pressing force exerted on the sealing ring 19, and therefore the deformation of this sealing ring 19, changes only to an insignificant degree.

Further, in the closed state of the valve, the supporting ring substantially protects against process gases entering on the side located opposite the valve plate.

The depressions in the lateral surface 18 of the valve plate in which the sealing ring and the supporting ring are arranged are selected in such a way that a suitable deformation of the sealing ring results in the closed state of the valve (for example, in a range of 10 to 15%). Instead of depressions of different sizes for the sealing ring 19 and supporting ring 20, projections of different sizes or a depression could be provided for the sealing ring and a projection could be provided for the supporting ring, or the surface 22 could be constructed in a stepped manner. Further, materials of varying elasticity could be provided for the sealing ring and the supporting ring. When a less elastic material is provided for the supporting ring compared with that provided for the sealing ring 19, the thickness of the sealing ring and supporting ring could also be selected in ratios other than those shown in FIG. 4, for example, they can be constructed with equal thickness.

The sealing arrangement could also be arranged at the valve seat 4 instead of at the lateral surface of the valve plate. The sealing surface would be provided at the lateral surface of the valve plate 3 in this case.

Figures 5, 6:
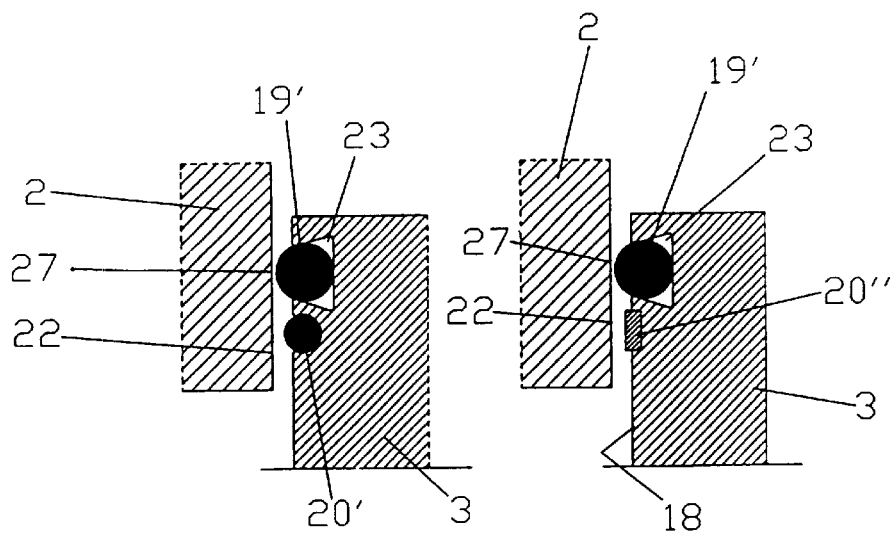
FIG. 5 is a view corresponding to FIG. 4 of another embodiment form of the invention.
FIG. 6 is a view corresponding to FIG. 4 of another embodiment form of the invention.

In the embodiment example of the invention shown in FIG. 5, the sealing ring 19' and the supporting ring 20' are constructed as separate parts. The sealing ring 19' is formed by an O-ring 17 lying in an undercut groove 23. In the open state of the valve, this groove 23 has free space into which the sealing ring 19' can deform in the closed state of the valve. In this embodiment example, the supporting ring 20' is likewise constructed as an O-ring. With the exception of an area of a groove protruding over the lateral surface 18, it is received in a groove which is adapted to the circumferential surface of the O-ring. The supporting ring 20' is accordingly only slightly deformable. In order to reduce the deformability of the supporting ring 20' relative to the sealing ring 19', the supporting ring 20' could also be constructed so as to be less elastic in comparison to the material of the sealing ring 19' or could be formed of a rigid plastic material.

In the embodiment example of the invention shown in FIG. 6, the supporting ring 20" has a rectangular cross-sectional surface. The supporting ring 20" is glued into a groove in the lateral surface 18 of the valve plate 3. The supporting ring 20" is formed of a suitable plastic material, e.g., Teflon®, PFA®, and so on.

In principle, the sealing rings and supporting rings shown, for example, in FIGS. 5 and 6, which are constructed as separate parts, can be arranged optionally at the valve plate or valve seat, i.e., these two parts can either both be arranged at the valve plate (which is preferable), or can both be arranged at the valve seat, or one of these two parts can be arranged at the valve seat and the other part can be arranged at the valve plate.

In the embodiment example of the invention shown in FIG. 7, the valve opening 1 is located in a wall 2 of a vacuum chamber 24. This wall 2 at which the valve seat 4 is provided is considered as a part of the vacuum valve. The actuation mechanism which moves the valve plate 3 and which, as was already stated, can be constructed in any manner in principle, is not shown in FIG. 7.

As follows from the preceding description, the field of the invention is not limited to the embodiment examples shown herein, but should be understood in relation to the attached claims together with the full range of possible equivalents.

Reference list 1 valve opening
2 wall
3 valve plate
4 valve seat
5 actuation device
6 wall
7 opening
8 valve rod
9 piston
10 cylinder
11 cylinder
12 piston
13 inner wall
14 wall
15 spring device
16 axis
17 O-ring
18 lateral surface
19, 19' sealing ring
20 20', 20" toothed rack
21 connection web
22 surface
23 groove
24 vacuum chamber
25 pins
26 bore hole
27 sealing surface

What is claimed is:

1. A valve plate for sealing a valve opening in a wall, an elastic sealing ring which is arranged at a lateral surface of the valve plate and which, in the closed state of the valve plate, is pressed by a pressing force between the lateral surface of the valve plate and a sealing surface which is arranged around the valve opening;

a supporting ring which comprises an elastic material and which is arranged at said lateral surface of the valve plate and, at least in the closed state of the vacuum valve, lies closer to the valve opening than the sealing ring, viewed from the sealing ring, and limits the pressing force acting on the sealing ring in the closed state of the vacuum valve;

wherein the sealing ring and the supporting ring are connected with one another via a connection web;

wherein sealing ring and the supporting ring are vulcanized to the valve plate;

wherein the sealing ring and the supporting ring each have a contact surface for contacting a surface surrounding the opening in the closed state of the valve plate and the contact surface of the supporting ring is at least twice as large as that of the sealing ring;

wherein the scaling ring and the supporting ring comprise the same elastic material;

wherein the thickness of the sealing ring, viewed in cross section, is greater than that of the supporting ring, and the distance of the lateral surface of the valve plate from the surface surrounding the valve opening is greater in the area of the sealing ring than in the area of the supporting ring; and wherein the supporting ring is projecting from said lateral surface of the valve plate in the closed state of the valve and also in the open state of the valve.

2. The vacuum valve of claim 1 wherein the sealing ring and the supporting ring lie in first and second depressions in the valve plate wherein the first depression for the scaling ring is deeper than the second depression for the supporting ring.

3. A vacuum valve comprising:

a wall with a valve opening and a valve seat;

a valve plate which is pressed against the valve scat in the closed state;

an elastic scaling ring which is arranged at a lateral surface of the valve plate or valve seat and, in the closed state of the valve, is pressed by a pressing force against a sealing surface arranged at the valve seat or at the valve plate and seals the valve opening;

a supporting ring which is made of elastic material and which is arranged at said lateral surface of the valve plate or valve seat and, at least in the closed state of the vacuum valve, lies closer to the valve opening than the sealing ring, viewed from the sealing ring, and limits the pressing force acting on the sealing ring in the closed state of the vacuum valve;

wherein the sealing ring and the supporting ring are connected with one another via a connection web;

wherein the sealing ring and the supporting ring are vulcanized to the valve plate or to the valve seat;

wherein the sealing ring and the supporting ring each have a contact surface for contacting a surface surrounding the opening in the closed state of the valve plate and the contact surface of the supporting ring is at least twice as large as that of the sealing ring;

wherein the sealing ring and the supporting ring comprise the same elastic material;

wherein the thickness of the sealing ring, viewed in cross section, is greater than that of the supporting ring, and the distance of the valve plate from the surface surrounding the valve opening is greater in the area of the sealing ring than in the area of the supporting ring; and wherein the supporting ring is projecting from said lateral surface of the valve plate or valve seat in the closed state of the valve and also in the open state of the valve.

4. The vacuum valve of claim 3 wherein the sealing ring and the supporting ring lie in first and second depressions in the valve plate wherein the first depression for the sealing ring is deeper than the second depression for the supporting ring.

* * * * *